Nov. 8, 1966 M. NAIMAN ET AL 3,284,013

INVERTED V VACUUM LOOP BOX

Filed June 16, 1964

INVENTORS
MARK NAIMAN
HERBERT F. WELSH, DECEASED
BY JULEA S. CHAPLINE, EXECUTRIX
BY
Thomas P. Murphy
AGENT United States Patent Office 3,284,013
Patented Nov. 8, 1966

3,284,013
INVERTED V VACUUM LOOP BOX

Mark Naiman, South Lincoln, Mass., and Herbert Frazer Welsh, deceased, late of Philadelphia, Pa., by Julea S. Chapline, executrix, Philadelphia, Pa., assignors to Sperry Rand Corporation, New York, N.Y., a corporation of Delaware Filed June 16, 1964, Ser. No. 376,301
6 Claims. (Cl. 242—55.12)

Figure 1:
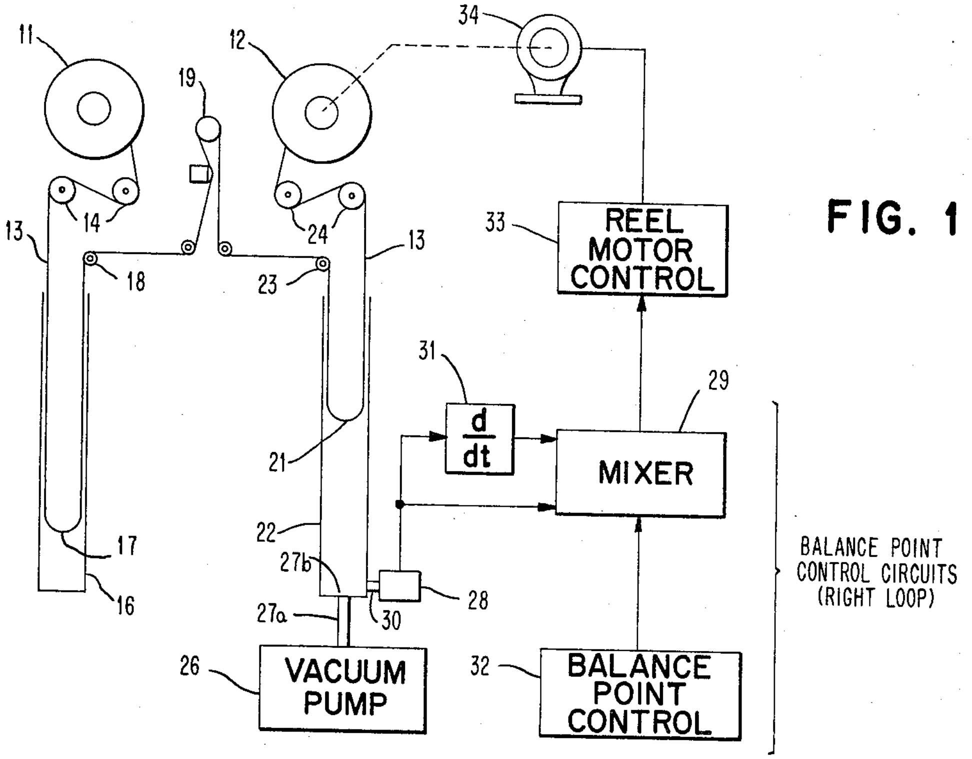

This invention relates to a tape transport system and more particularly to a reel motor control for maintaining a tape loop at a desired length within a vacuum loop box. In a typical tape transport a capstan is used to drive tape past a recording head at the desired speed. Normally a storage reel supplies tape to the capstan and a take up reel rewinds the tape after recording or read out thereof. In normal operation buffer loops of tape are required between the supply reel and the capstan and between the take up reel and the capstan to accommodate the rapid acceleration and deceleration of the tape by the capstan to the less rapid acceleration and deceleration of the reels. This is so since the differences in acceleration and deceleration between the capstan and the reels might result in the severing or other serious damaging of the tape if buffer loops of tape were not provided. Obviously, to make effective use of the buffer loops thus provided some means for maintaining the loops at various predetermined lengths is required. This is accomplished by a reel motor drive control for controlling speed of the reel drive motor in accordance with a sense deviation of the length of the loop from a desired value.

Various means for sensing the length of the loop within a vacuum loop box and providing a control voltage to the reel motor drive control for causing the reel motor to maintain the loop length at some predetermined desired value are presently available. For example, the length of tape loop disposed in a vacuum loop box has been detected by photoelectric means, by self-synchronous generators, or by a plurality of vacuum transducers disposed at intervals along the vacuum loop box. Each of these methods involve considerable complexity in the electrical circuitry required for the implementation thereof.

The present invention contemplates a tape loop length control sensing and control system which involves the use of a single vacuum sensing element in novel combination with a unique structural modification of a typical vacuum loop box wherein the pressure or vacuum in the space within the box between the end of the tape loop and the box is made to vary as a function of the length of the loop disposed within the box.

Thus, through an unique structural modification of a vacuum loop box the complexity of the sensing electrical circuitry may be greatly reduced with the resultant reduction in possibility of error and inaccuracy.

Therefore, it is an object of the present invention to provide a reel motor control in combination with a unique tape loop length detector.

Another object of the present invention is to provide a uniquely constructed vacuum loop box wherein the pressure varies as a function of the length of the tape loop disposed therein.

A further object of the present invention is the provision of a tape transport system including unique tape loop length sensing means in combination with a reel motor control system for maintaining the length of the tape loop within a vacuum loop box at a desired value.

A still further object of the present invention is to provide a novel arrangement for sensing and providing an output voltage proportional to the length of a tape loop within a vacuum loop box.

Figures 2A, 3:
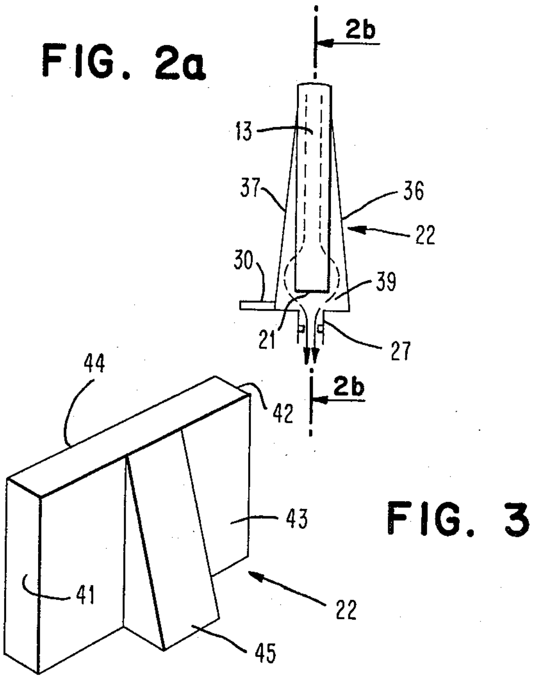
Figure 2B:
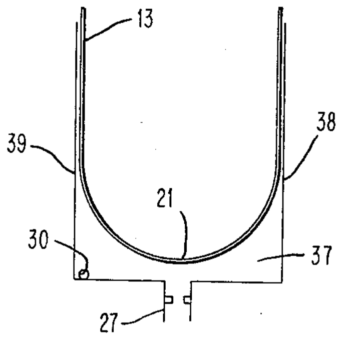

Numerous other objects and many of the attended advantages of the present invention will become more apparent upon reading the following specification taking in conjunction with the accompanying drawings wherein:

FIGURE 1 illustrates in mechanical schematic and electrical block diagram form a preferred embodiment of the reel motor control system of the present invention;

FIGURES 2*a* and 2*b* illustrate an end view and side view respectively of a preferred embodiment of the vacuum loop box of the present invention;

FIGURE 3 illustrates in pictorial form a second embodiment of the vacuum loop box of the present embodiment.

Referring now more particularly to FIGURE 1 there is shown a tape transport system comprising a supply reel 11 and a take up reel 12. Supply reel 11 supplies tape 13 via idler pulleys 14 to vacuum loop box 16 wherein tape 13 is constrained to form a loop 17 with the further aid of idler pulley 18. The tape 13 is thence looped about drive capstan 19, after which it is constrained to form a loop 21 in a vacuum loop box 22 by means of idler pulleys 23 and 24 which are arranged in a manner similar to the arrangement of idler pulleys 14 and 18. Thereafter, tape 13 is supplied to take up reel 12.

The elements just described illustrate in a general way a conventional mechanical arrangement for supplying and taking up a magnetic tape aftter a drive capstan has driven the tape past a recording or read out head (not shown). The drive and drive control means of capstan 19 are not shown since such form no part of this invention and would serve no useful purpose in the explanation thereof. The use of loop boxes for holding buffer loops of the tape solve in a conventional manner the well known problem caused by the differences in acceleration and deceleration capability of tape reels compared to acceleration and deceleration capability of the capstan. Therefore, since on start, stopping, and reversing of tape movement by capstan 19 the accelerations and decelerations of the tape are not compatible with the acceleration and deceleration of take up and supply of reels 11 and 12, loops 17 and 21 are provided to give a buffer region while reels 11 and 12 are building to proper speed.

Since it is the primary object of this invention to maintain the tape loops at predetermined lengths within the vacuum loop boxes and although this predetermined length in a particular box may change depending on whether the tape is running in the forward or reverse directions, it is felt that the invention can best be explained with reference to a single vacuum loop box and its associated control circuitry. Therefore, the reel motor control system is discussed hereinbelow with reference to vacuum loop box 22 and take up reel 12. It is to be understood, however, that the discussion applies equally to the reel motor control of supply reel 11 which is identical in structure to the one to be discussed.

Tape loop 21 is shown in the desired length within vacuum loop box 22 for the situation when reel 11 is supplying and reel 12 is taking up the tape or in other words when the tape transport is in the forward running position. Vacuum loop box 22 is connected to vacuum pump 26 which communicates with the space within a vacuum loop box 22 by means of a conduit 27. Vacuum pump 26 functions to continuously evacute the air from within vacuum loop box 22, which in a manner well known in the art maintains or holds tape loop 21 within vacuum loop box 22. A pressure transducer 28 which provides an output voltage proportional to the pressure impinging on its sensitive element communicates with the space within vacuum loop box 22 by means of a conduit 30 near the bottom of vacuum loop box 22. Alternatively, pressure transducer 28 may be disposed within vacuum loop box 22 in which case an electrical output terminal would pass through the wall of vacuum loop box 22.

Vacuum loop box 22 is so constructed (to be more fully explained hereinbelow) that its cross sectional area decreases from bottom to top. Furthermore, loop 21 is so disposed within vacuum loop box 22 that the pressure within the space between tape loop 21 and the end of vacuum loop box 22 varies as a function of the length of the loop 21 extending into box 22. Therefore, due to its particular structure the box in conjunction with transducer 28 functions as a sensing means to provide an output voltage representative of the length of tape loop 21 within the box.

The output of pressure transducer 28 provides an input voltage to mixer circuit 29 representative of loop length within a vacuum loop box 22. The output voltage from transducer 28 is also fed to mixer circuit 29 via differentiator circuit 31 where it is converted to a signal representative of the rate of change of loop length within vacuum loop box 22. This rate of change of voltage provides a second input to mixer circuit 29. Although the voltage fed from transducer 28 to mixer circuit 29 is proportional to pressure within vacuum loop box 22, it is not useful as a control signal in so far as it is not proportional to deviation of loop 21 from a desired position. Consequently, a balance point bias control circuit 32 is used to provide reference voltages to mixer 29. Balance point bias control circuit 32 provides mixer circuit 29 with a first reference voltage representative of desired loop position when the tape transport is in a forward running condition as shown and a second reference voltage representative of desired loop position when the tape transport is in the backward running position. In the latter situation loop 21 has a desired position closer to the bottom of vacuum loop box 22.

In the forward running situation balance point bias control circuit 32 provides an input to mixer circuit 29 which is a reference voltage indicative of the desired loop position for the forward running situation. When the loop is in this position, the output from transducer 28 to mixer 29 is in balance and equal to the output from balance point bias control 32 to thereby provide motor 34 with no correcting voltage. Upon deviation of loop 21 from the desired position the output from transducer 28 differs in amplitude and sense from the output of balance point bias control circuit 32 depending on amount and direction of loop position change to provide motor 34 with an error voltage via reel motor control circuit 33 to cause the speed up or speed down of the rate of take up reel 12. It should be understood that when the loop 21 has no deviation from the desired position motor 34 drives take up reel 12 at the proper speed. Although it is not shown, the power source for driving the motor 34 may be included in reel motor control 33 with the output from mixer 29 over riding the motor power source voltage.

FIGURE 2*a* illustrates an end view of one embodiment of vacuum loop box 22. In this embodiment vacuum loop box 22 comprises two oppositely disposed sidewalls 36 and 37 which slope inwardly from bottom to top. Vacuum loop box 22 further comprises two oppositely disposed parallel walls 38 and 39 as best seen in FIGURE 2*b*. In FIGURE 2*a* wall 38 has been removed while in FIGURE 2*b* wall 37 has been removed. Conduit 30 leads directly to transducer 28 while conduit 27*a* goes to vacuum pump 26. Tape 13 is disposed in vacuum loop box 22 with its flat portion substantially parallel to sides 38 and 39. Air flow is through the top of vacuum loop box 22 downward through conduit 27 thence to vacuum pump 26. Due to the sloping sides 36 and 37 the cross sectional area of vacuum loop box 22 decreases from bottom to top. Thus, as tape loop 21 moves toward the top of vacuum loop box 22, the air passage becomes smaller and smaller. This decrease in size continues until the tape loop is at the top of vacuum loop box at which time the cross sectional area of air passage is at its smallest point.

Transducer 28 measures the pressure difference between the inside and outside of the vacuum loop box 22. When the tape loop 21 is at the bottom of the loop box, there is effectively no pressure differential sensed by transducer 28 since the air passage is at its largest size. As the air passage is decreased in size due to the tape moving upward the air flow is partially blocked and the space underneath the tape loop is at less pressure than outside pressure. Thus, transducer 28 effectively measures and provides a voltage proportional to the distance at the loop is extended into the vacuum loop box.

When tape 13 is rapidly removed from vacuum loop box 22, the decrease in pressure is measured by transducer 28 and the difference is proportional to the rate of tape removal. Thus, a high rate of tape removal gives a high pressure differential while a low rate of tape removal gives a low pressure differential.

Where greater storage of buffer loops is desired, the above described vacuum loop box may be used in conjunction with a plurality of other boxes constructed identically to the one described. The transducer and vacuum pump would then be connected in a continuous fashion to each one of the plurality of vacuum loop boxes.

FIGURE 3 is a pictorial illustration of a second embodiment of vacuum loop box 22. This embodiment is useful in preventing wobbling of the tape due to differences in air flow or slight flexing of the tape etc. In FIGURE 3 vacuum loop box 22 comprises oppositely disposed and parallel walls 41 and 42. Vacuum loop box 22 further comprises two oppositely disposed walls 43 and 44 in parallel relationship. However, each of walls 43 and 44 comprise a mid portion 45 which juts out from each of the walls 43 and 44 as shown with reference to wall 43. This mid portion 45 provides the vacuum loop box 22 of FIGURE 3 with a decreasing cross sectional area from bottom to top. This results in the decreasing air passage necessary to provide a pressure change proportional to the length of the tape loop within the box. At the same time the parallel portions of the walls 43 and 44 act as guides to the tape to thereby prevent wobbling.

Obviously many other modifications of the present invention are possible in the light of the above disclosure which is not to be construed as a limitation of the present invention except insofar as limitations are imposed by the following claims.

The embodiments of the invention in which an exclusive property or privilege is claimed are defined as follows:

1. In a tape transport; a vacuum loop box comprising four walls forming an elongated, enclosed space having an opening at one end and a fifth wall enclosing said space at the other end, said four walls including a pair of oppositely disposed surfaces sloping inwardly from bottom to top causing the cross sectional area of said space to decrease from bottom to top, said four walls further including a pair of oppositely disposed, parallel surfaces, pump means connected near the bottom of said vacuum loop box continuously evacuating the air from said vacuum loop box, means disposing a loop of tape within said vacuum loop box with the flat portion of said tape substantially in parallel relationship to said parallel surfaces whereby a vacuum is created between said loop and said vacuum loop box having a value which varies as a function of the length of said loop of tape within said vacuum loop box.

2. A vacuum loop box comprising in combination; four walls forming an elongated, enclosed space having an opening at one end and a fifth wall enclosing said space at the other end, said four walls including a first pair of oppositely disposed surfaces sloping inwardly from bottom to top causing the cross sectional area of said space to decrease from bottom to top, said four walls further including a second pair of oppositely disposed, parallel surfaces, said walls which comprise said first pair of surfaces further comprising guide means for preventing wobbling of tape between said sloping surfaces, pump means connected near the bottom of said vacuum loop box continuously evacuating the air from said vacuum loop box, means disposing a loop of tape within said vacuum loop box with the flat portion of said tape substantially in parallel relationship to said parallel surfaces whereby a vacuum is created between said loop and said vacuum loop box having a value which varies as a function of the length of said loop of tape within said vacuum loop box.

3. A vacuum loop box comprising in combination; four walls forming an elongated, enclosed space having an opening at one end and a fifth wall enclosing said space at the other end, said four walls including a first pair of oppositely disposed surfaces with the middle portions of said surfaces sloping inwardly from bottom to top and the outer portions of said surfaces in parallel relationship from bottom to top, said four walls further including a second pair of oppositely disposed, parallel surfaces, pump means connected near the bottom of said vacuum loop box continuously evacuating the air from said vacuum loop box, means disposing a loop of tape within said vacuum loop box with the flat portion of said tape substantially in parallel relationship to said parallel surfaces whereby a vacuum is created between said loop and said vacuum loop box having a value which varies as a function of the length of said loop of tape within said vacuum loop box.

4. In a tape transport; capstan means for moving tape at a predetermined rate, storage reel means feeding tape to said capstan means at said predetermined rate, a vacuum loop box storing a loop of said tape between said capstan means and said storage reel means, said vacuum loop box comprising four walls forming an elongated, enclosed space having an opening at one end and a fifth wall enclosing said space at the other end, two of said four walls including a pair of oppositely disposed surfaces sloping inwardly from bottom to top causing the cross sectional area of said space to decrease from bottom to top, the other two of said four walls further including a pair of opposite disposed parallel surfaces to which the flat portions of the stored tape are substantially parallel.

5. In a tape transport system, a vacuum loop box comprising, a source of fluid flow, a first pair of walls disposed in parallel relationship, a second pair of oppositely disposed walls forming an enclosed space with said first pair of walls, each of said second walls sloping toward each other from the bottom of said loop box to its top, a further wall sealing the bottom of said loop box, means forming a loop of tape in said enclosed space with the flat portions of said tape substantially parallel to said first pair of walls whereby the amount of flow of fluid through said loop box may be varied by the position of said loop of tape within said loop box.

6. A vacuum loop box comprising in combination, a first pair of walls in oppositely disposed parallel relationship, a second pair of oppositely disposed walls forming an enclosed space with said first pair of walls, a further wall forming a bottom to said vacuum loop box, each wall of said second pair of walls having a central portion, said central portions sloping toward each other, each wall of said second pair of walls further including portions disposed on opposite sides of said central portion and in parallel relationship to similar portions on the other of said second pair of walls, said last mentioned portions forming a tape guide when a loop of tape is disposed in said loop box with its edges adjacent said surfaces of said parallel portions of said second pair of walls.

References Cited by the Examiner

UNITED STATES PATENTS

| | | | |
|---|---|---|---|
| 3,074,661 | 1/1963 | Brumbaugh et al. | 242—55.12 |
| 3,134,528 | 5/1964 | Dickery | 226—97 |
| 3,156,423 | 11/1964 | Potter et al. | 242—55.12 |

FRANK J. COHEN, *Primary Examiner.*

GEORGE F. MAUTZ, *Examiner.*